J. H. BELL.
BEAN CUTTER.
APPLICATION FILED OCT. 7, 1918.
1,318,527.
Patented Oct. 14, 1919.
2 SHEETS—SHEET 1.
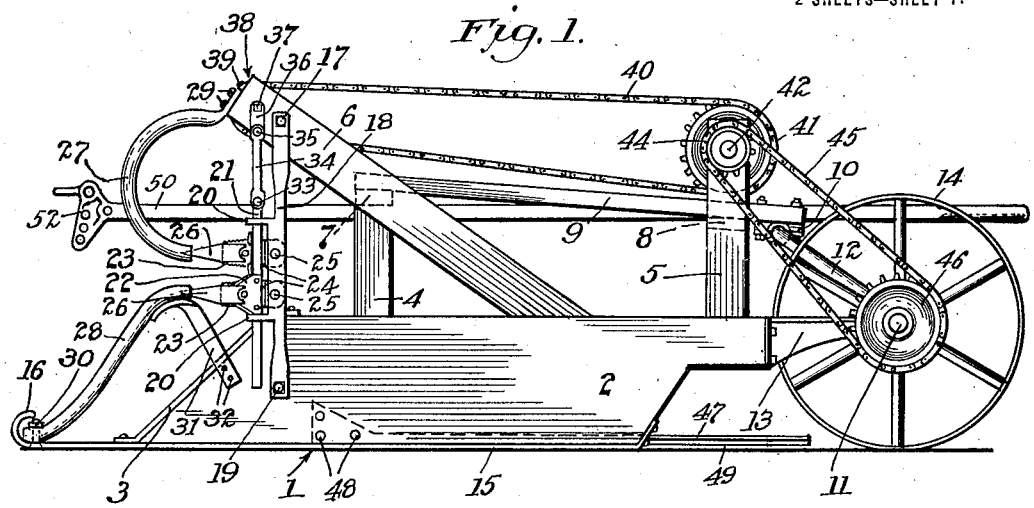
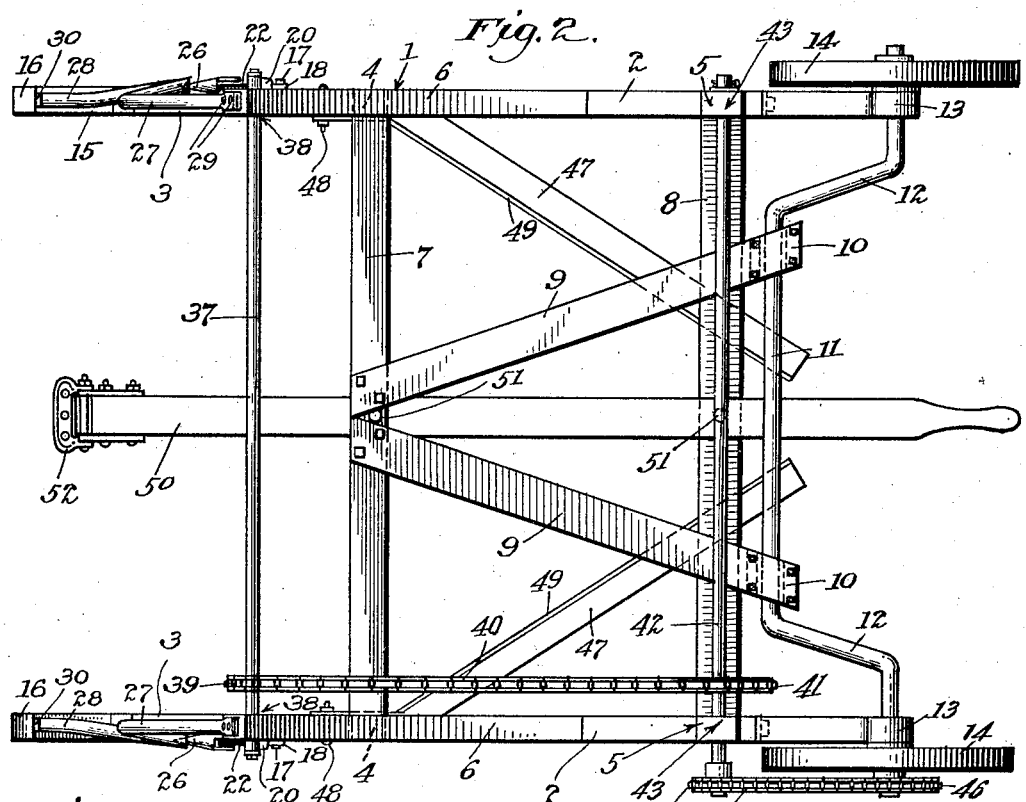
Witnesses:
Inventor:
James H. Bell,
By Frederick B. Ryan.
Attorneys

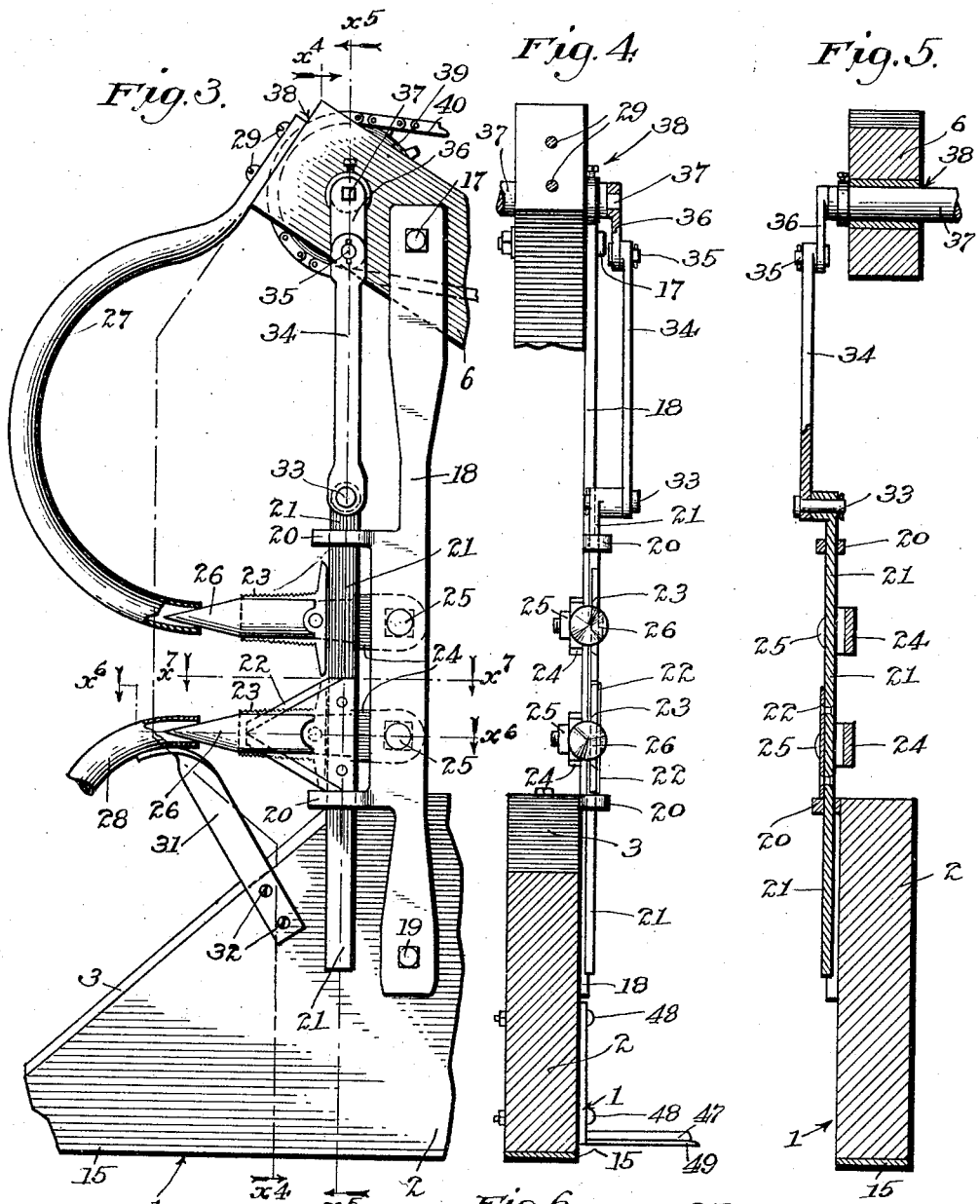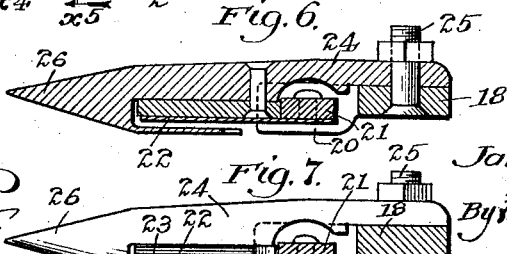

UNITED STATES PATENT OFFICE.

JAMES H. BELL, OF CAMARILLO, CALIFORNIA.

BEAN-CUTTER.

1,318,527.   Specification of Letters Patent.   Patented Oct. 14, 1919.

Application filed October 7, 1918. Serial No. 257,137.

*To all whom it may concern:*

Be it known that I, JAMES H. BELL, a citizen of the United States, residing at Camarillo, in the county of Ventura and State of California, have invented a new and useful Bean-Cutter, of which the following is a specification.

This invention relates to agricultural devices of the character designed to cut the runners of bean vines during the harvesting of the beans. The bean cutters at present in use are in the form of a sled and the runners of the sled are provided with knives designed to cut the vine stalks but many of the runners are not cut and consequently the runners are pulled by the sled and such pulling shakes the beans from the pods onto the ground and great numbers of the beans are lost.

An object of this invention is to avoid the shaking of the beans from the pods.

Another object is to provide a bean cutter that will not fail to cut the crosswise runners of the vines.

Another object is to make provision for feeding the vine runners to the cutters as the cutter advances along the row of vines.

Another object is to provide a cutter that while comparatively simple in construction is reliable in operation.

Other objects and advantages will appear in the subjoined detailed description.

The accompanying drawings illustrate the invention.

Figure 1 is a side elevation of a bean cutter built in accordance with the provisions of this invention.

Fig. 2 is a plan view of Fig. 1.

Fig. 3 is an enlarged fragmental side elevation of the front portion of the bean cutter, portions of the guides being shown in section for clearness of illustration.

Fig. 4 is an elevation mainly in section on the irregular line indicated by $x^4$—$x^4$, Fig. 3.

Fig. 5 is a sectional elevation on line indicated by $x^5$—$x^5$, Fig. 3.

Figs. 6 and 7 are plan sections on lines indicated by $x^6$—$x^6$ and $x^7$—$x^7$, respectively, Fig. 3.

There is provided a suitable frame which may be in the form of a sled indicated in general by the character 1. The frame or sled comprises runners 2 having their front ends beveled upward and rearward as indicated at 3. The frame also comprises front standards 4 and rear standards 5 extending up from the runners 2. Also extending up from the runners 2 forwardly and upwardly aslant are arms 6. A cross bar 7 is fastened at its ends to the arms 6 and a cross bar 8 is fastened at its ends to the standards 5. Fastened at their forward ends to the cross bar 7 are braces 9 which extend rearward and rest upon the cross bar 8. These braces 9 extend rearwardly of the cross bar 8 and are provided at their rear ends with brackets 10 which securely hold an axle 11. The axle 11 is bent aslant downwardly and rearwardly near its outer ends at 12 and the end portions are held in brackets 13 which are bolted or otherwise secured to the rear ends of the runners 2. The axle 11 has its ends projecting beyond the outer faces of the brackets 13 and on said ends are journaled wheels 14 adapted to run on the ground to prevent the runners 2 from sinking into the earth. The parts above described with the exception of the axle 11 and wheels 14 together constitute the frame 1.

The runners 2 may be shod with strap iron shoes 15, if desired, so as to take the wear occasioned by friction with the ground. The forward ends of the shoes 15 are preferably upturned as at 16 so as to easily ride over obstructions.

To the forward ends of the arms 6 are fastened by bolts 17 or their equivalents the upper ends of vertical knife supports 18 which are also fastened at their lower ends by bolts 19 or their equivalents to the outer faces of the runners 2. The knife supports 18 are in the form of flat bars and are provided with forwardly projecting lugs forming guides 20, there being two such guides one above the other on each knife support. Reciprocatively mounted in the guides 20 of each knife support is a rod 21 provided with a two-edged knife blade 22. When the rods 21 are reciprocated each of them moves its knife blade 22 past the cutting edges of stationarily mounted knife blades 23 which are secured to brackets 24 fastened by bolts 25 to the knife supports 18, said brackets extending forwardly from the supports. There is a pair of knife blades 23 at each side of the bean cutter, the blades of each pair being vertically alined one above the other and spaced slightly from one another.

The brackets 24 are provided with pointed or conical ends 26 which are inserted in upper and lower vine guides 27 and 28 which may be of tubular or other suitable construction. The upper vine guides 27 are curved upwardly in a semicircle and are fastened by screws 29 or their equivalents to the upper ends of the arms 6. The lower vine guides 28 extend aslant downwardly and forwardly and are fastened at their lower ends by bolts 30 or their equivalents to the shoes 15 just rearwardly of the curved ends 16. The lower vine guides 28 are welded or otherwise fastened at their rear ends to braces 31 which in turn are fastened by screws 32 or their equivalents to the outer faces of the runners 2.

Means are provided to reciprocate the rods 21 and suitable construction for effecting this will now be described. The rods 21 are pivoted at 33 to pitmen 34 which in turn are pivoted at 35 to cranks 36 of a shaft 37 journaled at 38 in the upper ends of the arms 6. The shaft 37 is turned by a sprocket 39 mounted thereon and connected by an endless chain 40 to a sprocket wheel 41 mounted on a shaft 42 which is journaled at 43 in the standards 5. One end of the shaft 42 is provided with a sprocket wheel 44 connected by an endless chain 45 with a sprocket wheel 46 mounted on the hub of one of the wheels 14 so that turning of said wheel will result in reciprocation of the knife blades 22.

The runners 2 are provided with knives 47 fastened at their forward ends by bolts 48 or the like to the inner faces of the runners and extending aslant rearward toward one another, the cutting edges 49 of the blades being directed forwardly so that when the sled is drawn forward the knives 47 will operate to cut the bean stalks from the roots.

A suitable tongue or draft bar 50 is fastened by bolts 51 or the like to the cross bars 7, 8 and is provided at its front end with a suitable clevis 52 for attaching to a tractor or other draft power.

To operate the bean cutter it will be drawn or propelled by any suitable power along a row of beans in a field with the sled astride of the row and the knife blades 22 will be reciprocated as above explained. As the sled advances the lower bean guides 28 will run beneath the laterally extending runners of the bean vines and said runners will slide upward and rearward between the knife blades 23. These knife blades in conjunction with the reciprocating blades 22 will sever the vine runners so that the vines of the row along which the sled is operating will be entirely separated from those of the rows of beans on both sides. From this it is seen that a positive cutting action is produced on the vine runners and that the vine runners are guided to the cutters so that they will all be severed without fail.

After the vine runners have thus been cut the knives 47 operate to cut the stalks close to the ground to free them therefrom.

By reason of all of the runners extending from one row to the next row on each side being severed it is clear that when the vines are gathered up in subsequent operations the vines of one row will not be disturbed when the vines of the next adjacent row are being gathered and therefore scattering of the beans from the pods onto the ground will be minimized. By operating with former bean cutters, few if any of the laterally extending runners are severed and consequently as the bean cutter progresses along the row it drags those laterally extending runners which are not severed thus pulling along some of the vines over the ground. This causes the beans to be shaken from the pods and they are scattered over the ground and lost. Thus it is clear that this invention minimizes the loss of beans in the field during the harvesting thereof.

I claim:

1. A bean cutter comprising a frame adapted to run along the ground, brackets connected with the front of the frame, knives mounted on the brackets, vine guides extending forwardly from the brackets and fastened to the frame, other knives movably mounted to coöperate with the first named knives to cut the vine runners, and operating means for said other knives.

2. A bean cutter comprising a frame having runners, knives mounted on the forward ends of the runners, vine guides extending rearwardly and upwardly aslant from the forward ends of the runners to adjacent the knives, other knives to coöperate with the first knives to cut the vine runners, and means to operate said other knives.

3. A bean cutter comprising a frame, a knife support on each side of the frame at the front thereof, a pair of brackets on each of the knife supports one above the other, knife blades fastened to said brackets, vine guides extending aslant downward and forward from the lowermost brackets to the lower portions of the frame, other vine guides extending in a curve upward from the uppermost brackets to the upper portion of the frame, other knives to coöperate with the first knives to cut the vine runners, and means to operate said other knives.

Signed at Camarillo, Cal., this 28th day of September, 1918.

JAMES H. BELL.

Witnesses:
GRACE MITCHELL,
MARY R. BELL.

Copies of this patent may be obtained for five cents each, by addressing the "Commissioner of Patents, Washington, D. C."